United States Patent [19]

Crippen

[11] 4,291,495

[45] Sep. 29, 1981

[54] APPARATUS AND METHOD FOR DRIVING STAKES

[76] Inventor: Michael R. Crippen, 1717 223rd SE., Issaquah, Wash. 98027

[21] Appl. No.: 137,727

[22] Filed: Apr. 7, 1980

[51] Int. Cl.³ ............................................. A01G 13/10
[52] U.S. Cl. .......................................... 47/23; 47/45
[58] Field of Search .......................... 47/23, 26, 45, 31

[56] References Cited

U.S. PATENT DOCUMENTS

| | | | |
|---|---|---|---|
| 325,184 | 8/1885 | Nichols | 47/23 |
| 472,137 | 4/1892 | McCallip | 47/23 |
| 503,948 | 8/1893 | Crews | 47/23 |
| 770,461 | 9/1904 | Haggerty | 47/23 |
| 862,698 | 8/1907 | Bierbaum | 47/23 |
| 1,464,801 | 8/1923 | Beers | 47/45 X |
| 2,056,136 | 9/1936 | Hyatt | 47/23 |
| 3,816,959 | 6/1974 | Nalle | 47/23 |

Primary Examiner—Robert E. Bagwill
Attorney, Agent, or Firm—Seed, Berry, Vernon & Baynham

[57] ABSTRACT

A hollow tube is designed to be threaded through the mesh of a degradable tubular guard structure which protects a seedling or the like from browsing animals. The hollow tube contains an elongated degradable support stake which is driven into the ground by a drive rod contained within the hollow tube using a slide-hammer which coaxially slides along the drive rod. The hollow tube is withdrawn from around the stake, leaving the tubular meshed structure fastened to the stake by a series of angled grooves formed in a series of longitudinal ribs extending from the stake.

22 Claims, 7 Drawing Figures

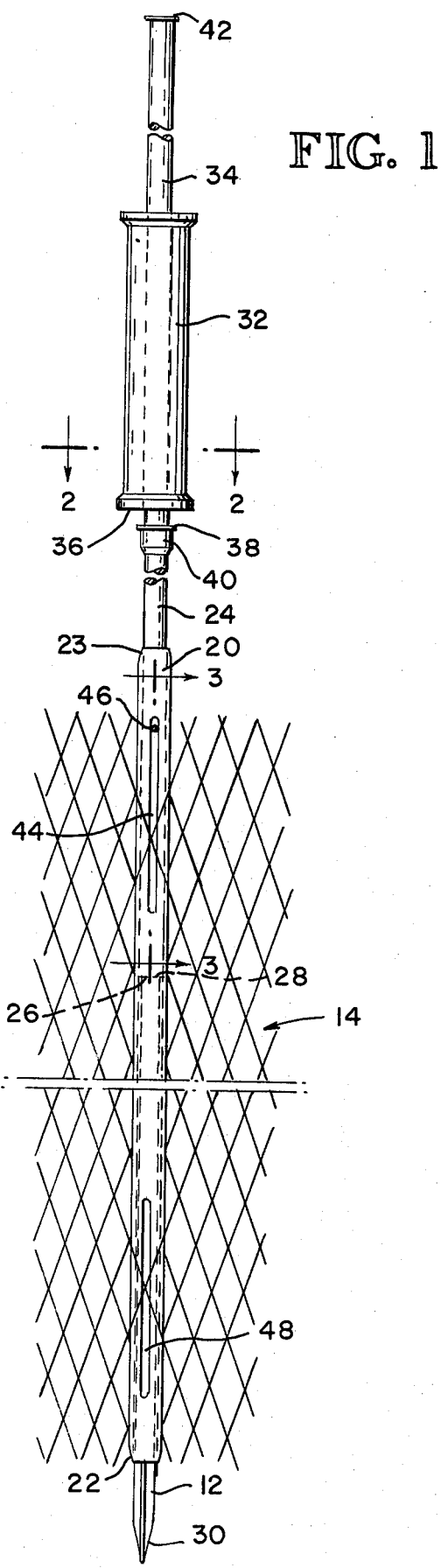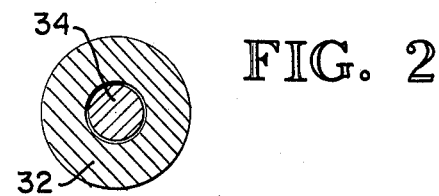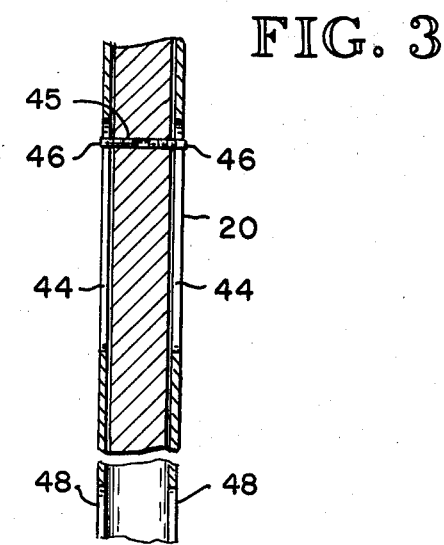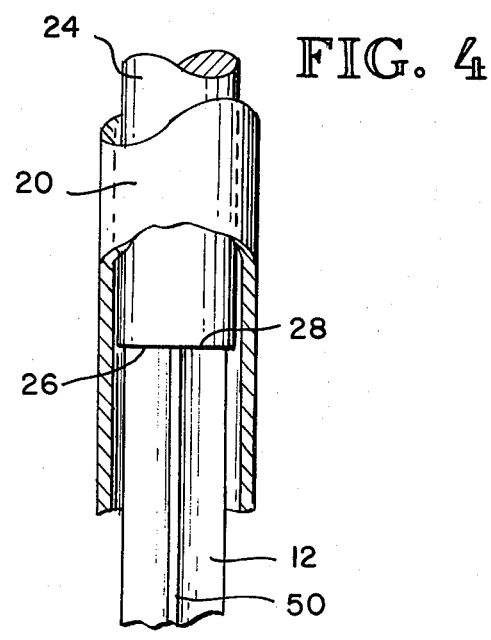

APPARATUS AND METHOD FOR DRIVING STAKES

BACKGROUND OF THE INVENTION

1. Field of the Invention

This invention relates to devices and methods for driving support stakes for animal guards.

2. Prior Art Relating to the Disclosure

Browse-guards protect tender young tree seedlings from being eaten by animals, such as mountain beaver, porcupine, and deer. After growing for a few years, a tree is not seriously injured by browse feeding and the guard must be removed in some manner as the tree grows larger. Installation of a browse-guard on each seedling is an expensive, labor-intensive operation and manual removal of such guards could also be expensive, particularly when dealing with the large numbers of seedlings required for reforestation of a clear-cut area or a forest-fire devastated area.

One type of meshed browse-guard has diamond-shaped grid openings and is fabricated of high-density polyethylene and polypropylene materials which degrade after several years of exposure of ultraviolet radiation. Degradation is controlled by the addition of appropriate ultraviolet inhibitors. After several years, this type of guard has been found to deteriorate in an environmentally acceptable fashion and eliminates the need for manual removal. The meshed structure of the browse-guard mentioned above is formed into an elongated cylinder with a diameter between 3 and 3½ inches and a length between 18 and 30 inches, with a 30-inch length being preferred for most applications.

Even though the meshed structure is self-supporting, additional support means for fastening the guard to the ground are required. Previously, several different types of stakes have been utilized, none of them being entirely satisfactory. For example, standard wood lathes, 1½ × ⅜ × 36 inches, have been used because they are readily available. The lathes are driven at their top ends into the ground and several metal wire ties are used to fasten the grid structure to the stake. When used in hard or rocky ground, a lathe being driven may bow and split or crack. Because the lathes are relatively large and heavy, an installer is limited in the number of lathes that he can carry in a bundle. If metal ties are used, this presents an environmental problem. If environmentally acceptable tie material is used, the tying operation is a slow, time-consuming task.

Other wooden items, such as reject arrow blanks, or hemlock dowels, are used as stakes. However, these items have the drawback that because they are very flexible, they easily break when hammered on an end into hard or rocky ground.

SUMMARY OF THE INVENTION

To overcome these and other deficiencies of the prior art, it is therefore an object of this invention to provide an inexpensive, simple apparatus and a method for driving a support stake for a meshed structure.

It is another object of the invention to provide apparatus and a method by which breakage of a stake is eliminated by providing support along the length of the stake as it is being driven.

It is another object of the invention to provide a structure which provides for automatic fastening of a support stake to a mesh structure.

It is another object of the invention to provide an inexpensively produced and installed degradable stake.

Basically, these and other objects of the invention are achieved by a stake driver structure and method and also by a stake design used in conjunction with the driver and the method. The apparatus for driving stakes includes a hollow tubular body which slidably receives a stake and which provides lateral support and guidance as the stake is axially driven into the ground. The tubular support containing a stake is threaded through a meshed structure. After the stake is driven, the tubular support is removed and the stake is left to support the mesh structure.

One embodiment of the invention includes a drive rod slidably mounted inside the hollow tubular body and driven by a slide-hammer. One particular type of stake utilized with the stake-driving apparatus has a plurality of laterally projecting strengthening ribs which include a plurality of spaced-apart notches formed in the ribs which engage the mesh structure after the driving device is removed from the stake. The method of staking the meshed structure to the ground includes loading a stake into a chamber formed in an elongated hollow casing which slidably supports the stake while it is being driven. The casing is then threaded through the meshed structure and the stake is driven into the ground using a rod extending into the casing. The casing is then removed from the stake, leaving the stake threaded through the meshed structure. In one embodiment of the method, the meshed structure engages spaced-apart grooves formed on the stake to hold the meshed structure in place.

BRIEF DESCRIPTION OF THE DRAWINGS

FIG. 1 is an assembled elevation view of a stake-driving apparatus according to the invention;

FIG. 2 is an enlarged sectional view of a slide-hammer and drive rod taken along section line 2—2 of FIG. 1;

FIG. 3 is an enlarged sectional view of a tubular casing and drive rod taken along section line 3—3 of FIG. 1;

FIG. 4 is an enlarged detail view of the end of the drive rod touching the top of a stake;

DETAILED DESCRIPTION OF THE PREFERRED EMBODIMENTS

Figure 5:
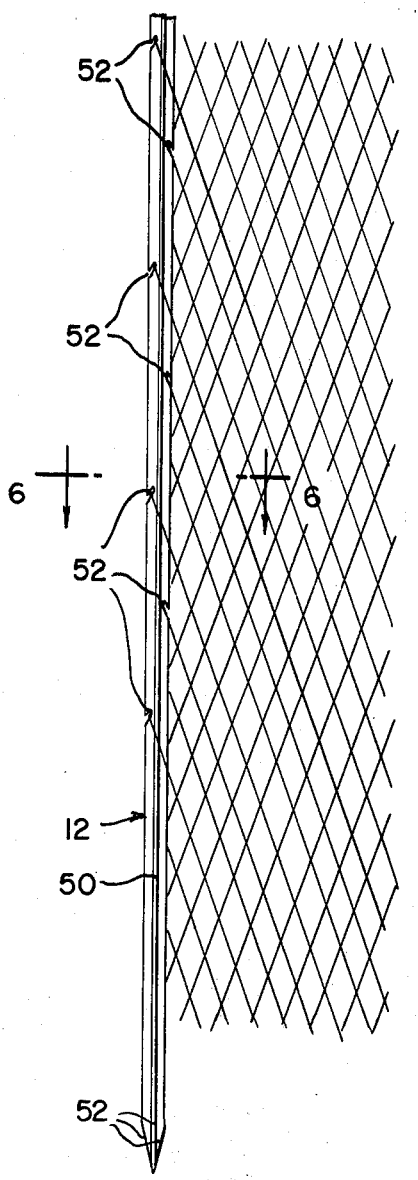
FIG. 5 is an elevation view showing a stake assembled to a portion of a meshed structure.

FIG. 1 of the drawing shows an assembled stake driver assembly 10 which supports an elongated stake 12 as it is driven into the ground. The driver assembly 10 is shown threaded through portions of a resilient meshed structure 14, which is typically formed from a 50% mixture of polypropylene and polyethylene, with ultraviolet inhibitors added for controlled degradation, eliminating the need for removal of the structure 14 after a seedling has grown sufficiently. The openings between the grid members of the meshed structure 14 are diamond-shaped, as shown.

The driver assembly 10 includes an elongated hollow tube 20 which is formed of 6061-T6 aluminum alloy. The tube 20 is symmetrical so that it can be turned end-for-end. Both the lower end 22 and the upper end 23 of the tube 20 are tapered slightly to facilitate threading through the meshed structure 14. A ⅜-inch diameter stainless steel drive rod 24 is slidably received in the hollow interior chamber formed longitudinally in the tube 20. As shown in FIGS. 1 and 4, an end 26 of the drive rod 24 contacts the upper end 28 of the stake 12. The stake 12 is inserted in the tube 20, so that it projects approximately 1½ inches beyond the lower end 22 of the tube 20. The projecting lower end 30 of the stake 12 is thrust into the ground and the tube 20 provides sufficient lateral support to prevent bending of the flexible stake 12 as it is driven by the drive rod 24 into the ground.

The drive rod 24 is guided by the tube 20 and is driven against the top end 28 of the stake 12 by a slide-hammer 32 which coaxially slides along the top end 34 of the drive rod 24. The slide-hammer 32 is a hollow cylinder made of stainless steel which, as shown in FIG. 2, concentrically slides along the upper portion 34 of the drive rod 24. An operator grasps the exterior surface of the slide-hammer 32, raises it to a position near the end of the upper portion 34 of the drive rod, and drives the face 36 of the lower end of the slide-hammer 32 against the upper face 38 of a steel collar 40 welded to the drive rod 24, as shown in FIG. 1. A cap 42 at the far end of the upper end 34 of the drive rod 24 is removable for cleaning the contacting surfaces of the slide-hammer 32 and the drive rod 24 as required. The mass of the slide-hammer is sufficiently large so that a few downward strokes are usually sufficient to drive the lower end of the stake 12 approximately 6 inches into the ground. The travel of the drive rod 24 within the tube 20 is limited by a pair of longitudinally extending slots 44 formed near the top of the tube 20 with lengths of approximatetly 6 inches. The drive rod 24 has threaded bores 45 on opposite sides formed which threadably receive set screws 46 which limit movement of the drive rod 24 to a distance defined by the ends of the slot 44. An operator is automatically prevented from driving a stake too deeply into the ground because the slots 44 limit the distance which the stake can be driven through the tube 20. FIG. 3 shows a detailed sectional view of the tube 20, the slots 44 and the roll-pin 46 extending through the drive rod 24.

Referring to FIG. 4, the end 26 of the drive rod 24 contacts the end 28 of the stake 12. The driving force for the stake 12 provided by the slide-hammer 32 is directed to the stake 12 by the drive rod 24. As the end of stake 12 is driven through the tube 20, the interior wall of the tube 20 provides lateral support for the stake so that it does not bend and break. The stakes may be wooden dowel rods or other suitable elongated pieces. Another pair of slots 48 are formed near the lower tapered end 22 of the tube 20 and are the counterparts of the slots 44 near the other end of the tube when the tube 20 is turned end-for-end. The slots 48 when oriented as shown in FIG. 1 also provide passages for dirt to escape from the lower end of the tube 20.

Figure 6:
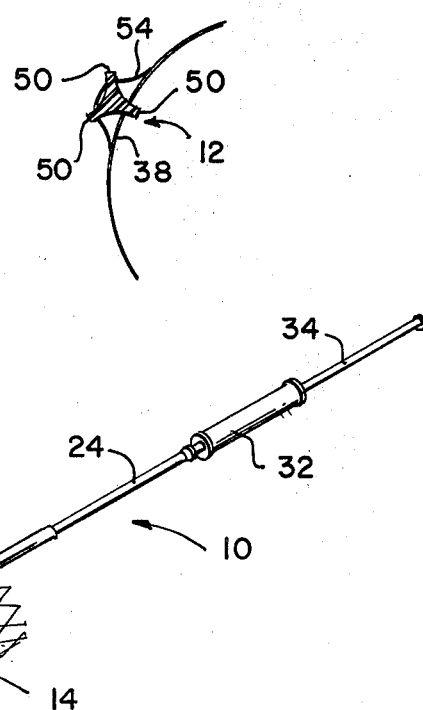
FIG. 6 is a sectional view of a stake and adjacent meshed structure taken along sectional line 6—6 of FIG. 5.

Referring now especially to FIGS. 5 and 6, a preferred stake 12 is shown which is formed of degradable material, such as, for example, a 50 percent mixture of high-density polypropylene and polyethylene with ultraviolet inhibitors added for controlled degradation. The cross-sectional view of FIG. 6 shows that the elongated stake 12 includes a plurality of laterally projecting ribs 50 which extend the length of the stake and strengthen the stake 12 using a minimum of material, important for economically mass-producing low-cost items of this nature. The end 30 of the stake 12 is formed with a sharp point to penetrate hard ground. The flexible structure of the stake 12 permits the stake to be bent around obstructions, such as rocks, without breaking when used with the driver assembly 10 shown in FIGS. 1 and 7. Because the tube 20 prevents the stake from bending, the cross-sectional area of the stake 12 is designed to be strong enough to support the mesh structure 14, shown in its entirety in FIG. 7. Additional cross-sectional area of the stake 12 is not required to strengthen the stake to prevent bending and breaking of the stake when it is being driven into the ground. This permits a considerable amount of material to be eliminated from a stake while still providing sufficient strength to support the mesh structure 14.

Referring to FIG. 5, a plurality of notches 52 extend from the center of the stake 12 outwardly and downwardly toward the lower end of the stake 12 are shown. When the stake 12 is driven into the ground and the tube 20 is slid upwardly away from the stake, the notches, or slots, 52 are resiliently engaged by portions 54 of the mesh grid along the inside of the stake 12, as shown in FIG. 6. Along the outside edge of the stake 12, certain portions 58 of the mesh structure engage other slots 52. The outside engaging portions 58 are determined when an operator threads the tube 20 through the resiliently meshed structure 14 as shown in FIG. 5. The slots 52 engaging the various parts of mesh structure prevent the mesh structure 14 from being vertically moved up the stake 12, which effectively locks the mesh structure 14 to the stake 12.

Figure 7:
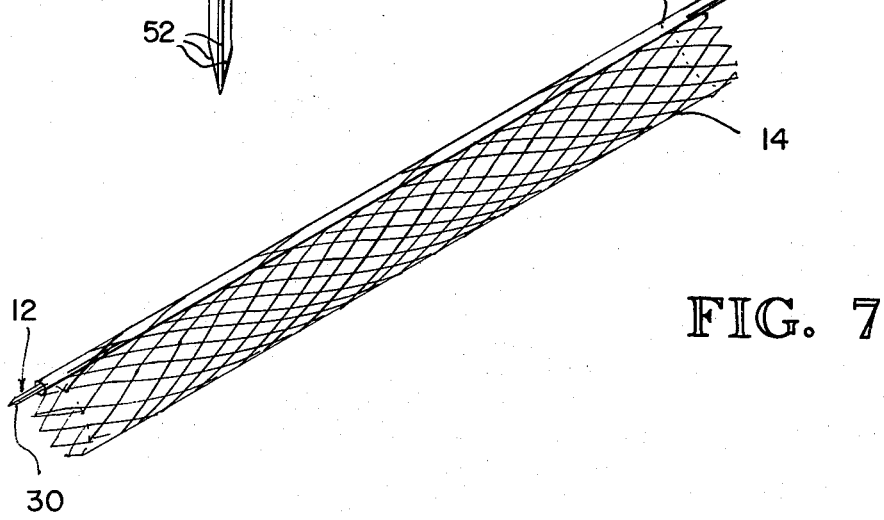
FIG. 7 is an isometric view showing a stake-driving apparatus threaded through a meshed structure.

In operation, an operator can very efficiently carry a large number of the improved, lightweight stakes 12 and a large number of the mesh structures 14 for staking seedlings and the like. After the operator completes one staking operation and while he is walking toward the next seedling, he loads one of the elongated stakes 12 into the interior chamber formed in the elongated hollow casing tube 20 for laterally supporting a stake. The operator threads the casing loaded with the stake 12 through a number of openings in the meshed structure 14, as shown in FIG. 7 and places the staking assembly 10 in a vertical position. The lower end 30 of the stake 12 is jammed into the ground and the mesh structure 14 surrounds the seedling. The operator then drives the stake into the ground using the slide-hammer 32, which is drawn up along the end 34 of the drive rod 24 and thrust down against the collar 40 on the drive rod 24, driving the end 26 of the rod 24 against the top end 28 of the stake 12. The distance which the end 30 of the stake 12 is driven into the ground is limited by the slots 44 and the stop screws 46 mounted to the the drive rod 24. After the stake 12 has been driven into place, the operator slidably removes the casing tube 20 from the portion of the stake extending above the ground. The stake remains and is threaded through the mesh structure 14 in a number of places so that the slots 52 engage the mesh structure and lock the mesh structure 14 in place on the stake 12.

While particular embodiments of the apparatus and method according to the invention have been shown and described, it should be understood that the invention is not limited thereto since many modifications may be made. It is therefore contemplated to cover by the present application any and all such modifications that fall within the true spirit and scope of the basic underlying principles disclosed and claimed herein.

I claim:

1. A removable device for driving a stake through a meshed structure surrounding a seedling or the like, comprising:
   means removably threaded through certain mesh openings of the meshed structure for laterally supporting and guiding a stake; and
   means for driving the stake through said support and guide means so that a portion of the stake is embedded in the ground and so that, when the said support and guide means are removed, the stake passes through the certain mesh opening and supports the meshed structure.

2. The device of claim 1 wherein the meshed structure is a degradable tube and the stake is degradable.

3. The device of claim 1 wherein the support and guide means includes an elongated body having a chamber formed therein for receiving said stake.

4. The device of claim 3 wherein the drive means includes a driving member slidably movable within the chamber and contacting the stake.

5. The device of claim 4, including means for delivering force to the slidable driving member to drive the stake.

6. The device of claim 4, including means for limiting the distance through which driving members moves.

7. The device of claim 6 wherein the holding means includes a slot formed in said stake and engageable with portions of the meshed structure.

8. A removable device for driving a stake through a meshed tube surrounding a seedling or the like, comprising;
   a hollow casing removably threaded through the meshed tube and having a chamber formed therein for receiving and guiding said stake;
   a drive rod slidably received in the hollow casing chamber, one end of said rod engaging an end of the stake; and
   means for operating the drive rod to drive the stake out through the chamber and partially into the ground so that, when the hollow casing is removed from the partially driven stake, the stake is threaded through the meshed tube.

9. The device of claim 8 wherein the end of hollow casing is tapered to facilitate being threaded through the meshed tube.

10. The device of claim 8, including means for limiting the distance which the stake is partially driven into the ground.

11. The device of claim 10 wherein the limiting means is formed between the casing and the drive rod and includes a slot and a projecting member engaged within said slot.

12. The device of claim 11 wherein the projecting member is removable.

13. The device of claim 8 wherein the operating means includes a slide-hammer slidably mounted on said drive rod and stopping against a portion of said rod to provide force to drive the stake.

14. The device of claim 13, including a collar portion of said rod against which said slide-hammer is stopped.

15. A stake adapted to be partially driven into the ground and securing a meshed structure to the stake, said stake comprising an elongated body and a plurality of laterally projecting ribs for strengthening said stake, said stake including a plurality of notches formed in said ribs, spaced apart for engagement with the mesh structure, and said notches are angled upwardly from the end partially driven into the ground so that the mesh structure is held within said notches.

16. The stake of claim 15 wherein the body and ribs are integrally formed of degradable material.

17. The stake of claim 15 wherein the stake has one end tapering to facilitate penetration of the ground and the other end is blunt for engagement with a driving tool.

18. A method of staking to the ground a meshed structure surrounding a seedling or the like, comprising the steps of:
   loading an elongated stake into a chamber formed in an elongated hollow casing for slidably supporting the stake;
   threading the loaded casing through the meshed structure;
   placing the loaded casing vertically to the ground, with the meshed structure surrounding the seedling;
   driving the stake partially into the ground with a rod extending into the chamber; and
   slidably removing the casing from the stake so that the stake is partially in the ground and is partially threaded through the meshed structure.

19. The method of claim 18, including the step of limiting the extent to which the stake is driven into the ground.

20. The method of claim 18, including the step of engaging portions of the mesh structure with spaced-apart grooves formed on the stake.

21. The method of claim 20, including the step of providing upwardly angled grooves on the stake.

22. The method of claim 20, including the step of forming the stake from a degradable material.

* * * * *